United States Patent
Mills et al.

(10) Patent No.: US 9,603,016 B1
(45) Date of Patent: *Mar. 21, 2017

(54) UNIQUELY IDENTIFYING A MOBILE ELECTRONIC DEVICE

(71) Applicant: Digital Proctor, Inc., Austin, TX (US)

(72) Inventors: Andrew Jesse Mills, New York, NY (US); Shaun Sims, Austin, TX (US)

(73) Assignee: DIGITAL PROCTOR, INC., Austin, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/484,718

(22) Filed: Sep. 12, 2014

Related U.S. Application Data

(63) Continuation of application No. 13/087,374, filed on Apr. 14, 2011, now Pat. No. 8,838,967.

(60) Provisional application No. 61/324,312, filed on Apr. 15, 2010.

(51) Int. Cl.
| | | |
|---|---|---|
| *H04L 9/32* | (2006.01) | |
| *G06F 21/00* | (2013.01) | |
| *G06F 7/04* | (2006.01) | |
| *H04M 1/66* | (2006.01) | |
| *H04W 24/00* | (2009.01) | |
| *H04W 12/06* | (2009.01) | |
| *H04L 29/06* | (2006.01) | |
| *G06F 17/30* | (2006.01) | |

(52) U.S. Cl.
CPC ...... *H04W 12/06* (2013.01); *G06F 17/30595* (2013.01); *H04L 63/08* (2013.01); *H04L 63/083* (2013.01); *H04L 63/0861* (2013.01)

(58) Field of Classification Search
CPC .... H04W 12/06; H04L 63/08; H04L 63/0861; H04L 63/083; G06F 17/30595
USPC ......... 726/5, 4; 713/168, 182; 455/410, 411, 455/425
See application file for complete search history.

(56) References Cited

U.S. PATENT DOCUMENTS

| | | |
|---|---|---|
| 6,862,610 B2 | 3/2005 | Shuster |
| 6,928,278 B2 | 8/2005 | Shimomura |
| 6,987,948 B2 | 1/2006 | Engstrom |
| 8,131,875 B1 | 3/2012 | Chen et al. |
| 8,838,967 B1 * | 9/2014 | Mills et al. .................. 713/168 |
| 2003/0046237 A1 | 3/2003 | Uberti |
| 2004/0204070 A1 * | 10/2004 | August et al. ............... 455/557 |
| 2005/0101310 A1 | 5/2005 | Shachak |
| 2005/0176465 A1 | 8/2005 | Fornell |
| 2005/0233733 A1 * | 10/2005 | Roundtree et al. ........ 455/414.1 |
| 2006/0217111 A1 | 9/2006 | Marolia et al. |
| 2008/0085731 A1 * | 4/2008 | Davidson et al. ............ 455/517 |
| 2008/0287101 A1 * | 11/2008 | An .......................... H04W 8/26 455/411 |
| 2009/0240947 A1 * | 9/2009 | Goyal et al. .................. 713/176 |
| 2009/0265754 A1 * | 10/2009 | Hinds .................. G06F 21/6218 726/1 |
| 2010/0094930 A1 | 4/2010 | Griff et al. |
| 2010/0125625 A1 | 5/2010 | Oliver et al. |
| 2010/0299719 A1 * | 11/2010 | Burks ................... G06F 9/44505 726/3 |
| 2010/0311391 A1 * | 12/2010 | Siu et al. ....................... 455/411 |
| 2011/0145919 A1 * | 6/2011 | Whelihan et al. .............. 726/22 |
| 2012/0131685 A1 * | 5/2012 | Broch .................... G06F 21/554 726/30 |

OTHER PUBLICATIONS

Seriot, Nicolas. "iPhone Privacy," Black Hat DC 2010.
Author unknown. "Edit distance," available online at http://en.wikipedia.org/wiki/Edit_distance, Wikipedia, retrieved on May 27, 2011.
Author unknown. "International Mobile Equipment Identity," Wikipedia, available online at http://en.wikipedia.org/wiki/International_Mobile_Equipment_Identity, retrieved on May 27, 2011.
Author unknown. "UIDevice Class Reference," Apple, Inc., available online at http://developer.apple.com/iphone/library/documentation/UIKit/Reference/UIDevice_Class/Reference/UIDevice,html, retrieved on May 27, 2011.

* cited by examiner

*Primary Examiner* — Aravind Moorthy
(74) *Attorney, Agent, or Firm* — Jackson Walker L.L.P.

(57) ABSTRACT

The Internet is becoming an essential part of our lives. This trend is even stronger with the rise of cell phones having Internet access that almost the entire population carries with them at all times. Security is a huge problem on the Internet, however, and new authentication methods are needed specifically for cell phones. Presented here is a method of identifying a mobile electronic device by its configuration settings, potentially including contact list information. This invention, in particular, fills a crucial need to secure access to the Internet from mobile phones.

20 Claims, No Drawings

UNIQUELY IDENTIFYING A MOBILE ELECTRONIC DEVICE

CROSS-REFERENCE TO RELATED APPLICATIONS

This patent application is a continuation of U.S. patent application Ser. No. 13/087,374, filed Apr. 14, 2011, which claims benefit of U.S. Provisional Patent Application No. 61/324,312, filed Apr. 15, 2010, the entirety of which are both hereby incorporated by reference.

STATEMENT REGARDING FEDERALLY SPONSORED RESEARCH OR DEVELOPMENT

Not Applicable

REFERENCE TO SEQUENCE LISTING, A TABLE, OR A COMPUTER PROGRAM LISTING COMPACT DISC APPENDIX

Not Applicable

BACKGROUND OF THE INVENTION

Field of Invention

The present invention relates to a method of watermarking mobile devices using their configuration settings so that remote systems trust interacting with them more.

Prior Art

The Internet is becoming an essential part of our everyday lives. People use the Internet to conduct commerce, communicate with friends, read the news, watch movies, get directions, etc. etc. This trend is intensifying even more with the rise of mobile phones. Mobile phones are owned by more than 90% of the US population. Even third world countries, which are currently too poor for mass adoption of personal computers, have impressive mobile phone adoption. Concurrently, the technical sophistication of mobile phones has advanced dramatically. Almost every new mobile phone has a built-in capability of accessing the Internet. These three amazing trends—the rise of the Internet, the rise of the mobile phone, and the technical advancement of the mobile phone—imply that soon, most people on the planet will have access to the Internet at any time and any place.

But there is a potential downside to this. While the Internet allows access to all sorts of useful information, if proper security is not in place, the Internet can allow other people to access your personal information fraudulently. In an extreme example, this personal information might be used to access your bank account. Of course, Internet security is not a new problem, in fact username/password authentication has been around for decades. However, now that the Internet contains so much sensitive personal information for so many people, username/password authentication is now seen as insufficient protection. Biometric technologies, such as fingerprint and iris recognition, have begun being used to authenticate users. IP address detection is sometimes used as a factor in authentication. All of these technologies, however, were not designed with mobile devices in mind. For example, an author of this patent recently used an IP "geo-location" service when connecting to the Internet through his phone. This service gave an address 200 miles away from where he actually was.

A new identification mechanism is needed for mobile devices, so that they can be authenticated and trusted by third parties.

Existing methods of identifying a mobile device include the following examples for mobile phones specifically. First, a phone may be identified by its International Mobile Equipment Identity (IMEI) number. An IMEI number is given to every phone using most of the newest cell networks (e.g., GSM, WCDMA, and iDEN). See Wikipedia's "International Mobile Equipment Identity" entry for more. However, accessing the IMEI number of a phone is typically not allowed in applications approved by the maker of a smart phone (e.g., an Apple iPhone application from the Apple iPhone App Store).

The Subscriber Identity Module (SIM) card number is another way of identifying a mobile phone. This number is usually only accessible by the cell network operator and the hardware layer of the phone. The reason for this is because if this number were leaked, someone could make fraudulent phone calls with the number, and that would lead to all sorts of problem for the phone company.

Apple iPhones and Research in Motion Blackberry devices, in particular, are also given supposedly unique identification numbers. For Apple iPhones, the code to get the unique identification number is "[[UIDevice currentDevice] uniqueIdentifier]". See entry for "UIDevice" in the Apple iPhone Developer's online documentation for details.

All of these unique numbers associated with phones are 1) easy to forge and 2) persistent even if the phone changes ownership. They do not establish a link between the user of a phone and the phone itself.

Patent application Ser. No. 10/280,732 by James Uberti describes a mechanism to uniquely identify a person in a financial transaction based on a combination of their biometrics. This invention identifies a person, but does not foresee how to identify a mobile device. Plus, the biometrics presented in this application are neither novel nor particularly relevant to a mobile device.

U.S. Pat. No. 6,987,948 by G. Eric Engstrom et al. considers customizations users may make to their mobile devices, but it does not envision how these customizations can be used to uniquely identify those mobile devices.

U.S. Pat. No. 6,928,278 by Satoshi Shimomura describes the concept of a "total personal password" which includes only the name, address, date of birth, and phone number of a mobile phone user. This type of information is stored all over the Internet—not just on a mobile phone. And information that is typically stored only on mobile phones, such as contact lists and mobile phone settings, is not considered. As such, this patent does not think to utilize the unique advantages of the mobile device environment. Also, this patent does not consider the larger context of uniquely identify a mobile device. Instead, it focuses on games and examinations.

U.S. Pat. No. 6,862,610 by Gary Stephen Shuster describes an identification mechanism using many personal questions. This patent is focused on minimizing the number of personal questions that need to be answered so that user privacy is maximized. But that is a completely orthogonal topic compared to discussion of what personal questions could help uniquely identify a person or device. And this patent is silent about identification of mobile devices specifically.

"iPhone Privacy" by Nicolas Seriot, published for the Black Hat DC 2010 conference, lists many unique identifiers that applications installed on an iPhone are able to gather. But this paper suggests that it would be bad for applications to do this, since getting these identifiers might put user privacy in jeopardy. This paper does not recognize that these same unique identifiers can help legitimate applications prove the identify a mobile device to a third party.

OBJECTS AND ADVANTAGES

Accordingly, the advantage of our invention is that it uses a mobile device's configuration settings to uniquely identify it. Mobile devices typically contain tons of configuration settings, and mobile phones in particular have contact lists (which represent a lot of information), so each mobile device will be found to be very different from every other.

BRIEF SUMMARY OF THE INVENTION

The present invention collects a multitude of configuration settings of a mobile device, does processing on this data, sends the processed data to a third party, and the third party compares the received data with data received earlier. In a preferred embodiment, the mobile device is a cell phone, and the configuration data includes address book information.

DRAWINGS

Not Applicable

DETAILED DESCRIPTION OF THE INVENTION

We begin by making some definitions. A "mobile electronic device," or, more casually, a "mobile device," is any device with at least some of the power of a computer which is small enough to be reasonable moved around. This invention is only concerned with mobile devices that can connect to a network of other computers (e.g. the Internet, an Intranet, or a phone company's network). A mobile device need not be carried by a human. A mobile device need not be a phone. An Apple iPad is one example of a mobile device that is not a phone.

"Contact list information" is information stored on a mobile device that allows an operator of a mobile device to easily connect to another person, phone, or mobile device. A phone's address book is one, but not the only, example of a contact list information.

"Configuration settings" of a mobile device include parameters an operator of that device has freedom to set in their phone. One example of a configuration setting is contact list information. If the mobile device is a phone, more examples of configuration settings are which wallpaper image users see as background to phone menu items, alarm clock settings, how menu items are arranged in the phone's user interface, shortcuts that are set (for example, pressing the left arrow key at a home screen might be programmed to directly open the recent call list), ring tone or vibration settings, which applications are installed, your keyboard cache (containing frequently typed words), etc.

The invention proceeds by first having an application running on the mobile device to collect certain configuration settings. Processing may occur to encrypt, sanitize, and/or summarize this information. The result of this is sent to a third party that is reachable via the computer network the mobile device has access to. Now the third party has baseline data. Later, when the mobile device or an operator of the mobile device attempts to connect to that third party again, the same or similar data is collected again and is run through the same or a similar processing step. The result is sent to the third party again. The third party compares the data the mobile device just sent with the data the mobile device sent previously. In a preferred embodiment, this similarity calculation may be the edit distance between the earlier configuration settings and the later configuration settings. See Wikipedia's "Edit_distance" entry for examples. The third party takes action based on the result of this similarity calculation.

This invention is useful for two crucial reasons. First is that configuration settings are unlikely to change dramatically from one interaction with the third party to the next. This is especially true compared with naïve indicators, such as the mobile device's location or IP address. A mobile device by definition may move around too much to make identification based on its location valuable. Also, mobile phones in particular use complicated methods to connect to the Internet, and their IP addresses are usually a poor identifier to the phone itself. The second crucial benefit of this invention is that a third party might hold sensitive personal information (e.g. banking information). The third party can use this invention to make sure sensitive personal information is only accessed from mobile devices that are known to be owned by a person who is allowed to access that personal information. This invention may be particularly useful in combination with other authentication techniques. For example, may be a user is asked to scan their fingerprint or iris once a day to verify they are in possession of their mobile device. This is time consuming and cumbersome for the user, but it may be highly accurate and may prove the mobile device has not been lost or stolen. Then, if the user wishes to access the third party throughout the day, the mobile device is authenticated potentially automatically (without the user needing to take any action) by the present invention.

CONCLUSIONS, RAMIFICATIONS, AND SCOPE

The invention presented here is one of the best ways of uniquely identifying, and hence authenticating, a mobile device. This invention can be highly accurate, since there may be tons of configuration settings that different devices have set differently. This invention can occur without any user interaction. This invention can be used alongside other authentication or identification mechanisms—it is common practice in the security industry to combine authentication mechanisms. And, even though much of this disclosure discussed preventing unauthorized access to online data, the present invention is equally helpful in preventing any unauthorized activity online (other examples include changing data or taking an action).

Many of the examples given in the Specification were for mobile phones, but as said many times, there are many non-phone mobile devices such as personal digital assistants and hand-held computers. The present invention includes identification of those devices as well.

The "third party" mentioned many times may be one server, many servers working together, or something else.

While the foregoing written description of the invention enables one of ordinary skill to make and use what is considered presently to be the best mode thereof, those of ordinary skill will understand and appreciate the existence of variations, combinations, and equivalents of the specific embodiment, method, and examples herein. The invention should therefore not be limited by the above described embodiment, method, and examples, but by all embodiments and methods within the scope and spirit of the invention as claimed.

We claim:

1. A device identification method, comprising:
   receiving baseline configuration information indicative of a first plurality of mobile device configuration settings of a first mobile device;
   receiving subsequent configuration information indicative of a second plurality of mobile device configuration settings of a second mobile device;
   determining a similarity between the subsequent configuration information and the baseline configuration information; and
   responsive to detecting the similarity exceeding a threshold similarity, identifying the second mobile device as the first mobile device.

2. The method of claim 1, wherein the first mobile device comprises a mobile phone.

3. The method of claim 1, wherein the first mobile device comprises a portable computing device configured for connecting to a communications network.

4. The method of claim 1, wherein the baseline configuration information comprises encrypted information indicative of the first plurality of mobile device configuration settings.

5. The method of claim 1, wherein the baseline configuration information comprises compressed information indicative of the first plurality of mobile device configuration settings.

6. The method of claim 1, wherein the first plurality of mobile device configuration settings reflects contact list information associated with an address book of the first mobile device.

7. The method of claim 1, wherein the first plurality of mobile device configuration settings reflects information selected from the group consisting of: a wallpaper image of the first mobile device, ring tone settings of the first mobile device, a keyboard cache of the first mobile device, and alarm clock settings of the first mobile device.

8. The method of claim 1, wherein the baseline configuration information accords with applications installed on the first mobile device.

9. The method of claim 1, further comprising:
   responsive to the similarity being less than the threshold, requesting a user of the second mobile device for personal information.

10. The method of claim 9, wherein the personal information includes a username and password.

11. The method of claim 9, wherein the personal information includes biometric information indicative of a biometric characteristic of the user.

12. A device identification server configured to perform operations, the operations comprising:
   accessing baseline configuration information indicative of a first plurality of mobile device configuration settings of a first mobile device;
   accessing subsequent configuration information indicative of a second plurality of mobile device configuration settings of a second mobile device;
   calculating an edit distance between the subsequent configuration information and the baseline configuration information; and
   determining, in accordance with a similarity indicated by the edit distance, whether a mobile device associated with the subsequent configuration information is the first mobile device.

13. The device identification server of claim 12, wherein the first mobile device comprises a mobile phone.

14. The device identification server of claim 12, wherein the first mobile device comprises a tablet device.

15. The device identification server of claim 12, wherein the baseline configuration information is determined, at least in part, based on contact list information of the first mobile device.

16. The device identification server of claim 12, wherein the baseline configuration information is determined, at least in part, based on a wallpaper image of the first mobile device.

17. The device identification server of claim 12, wherein the baseline configuration information is determined, at least in part, based on alarm clock settings of the first mobile device.

18. The device identification server of claim 12, wherein the operations include:
   requesting personal information from a user of the second mobile device responsive to the similarity being less than a threshold.

19. The device identification server of claim 18, wherein the personal information includes information selected from:
   a username and password; and
   biometric information indicative of a biometric characteristic of the user.

20. An authentication method, comprising:
   accessing baseline configuration information determined in accordance with configuration settings of a first mobile device;
   accessing subsequent configuration information determined in accordance with configuration settings of a second mobile device;
   calculating a value indicative of a dis-similarity between the subsequent configuration information and the baseline configuration information; and
   responsive to the value being less than a threshold similarity, recognizing the second mobile device as the first mobile device.

* * * * *